UNITED STATES PATENT OFFICE.

ALFRED S. BURDICK AND CARL NIELSEN, OF CHICAGO, ILLINOIS, ASSIGNORS TO THE ABBOTT LABORATORIES, OF CHICAGO, ILLINOIS, A CORPORATION OF ILLINOIS.

VEGETABLE MILK.

1,273,145.  Specification of Letters Patent.  Patented July 23, 1918.

No Drawing.  Application filed July 13, 1917. Serial No. 180,354.

*To all whom it may concern:*

Be it known that we, ALFRED S. BURDICK, a citizen of the United States, and CARL NIELSEN, a subject of the King of Denmark, who has declared his intention to become a citizen of the United States, both residing at Chicago, in the county of Cook and State of Illinois, have invented certain new and useful Improvements in Vegetable Milk, of which the following is a specification.

Our invention relates to improvements in vegetable milk and has particular reference to a product designed to be prepared mainly or wholly from vegetable materials, the resultant product being suitable for use in cases where the milk obtained from animals, such as cows, is now employed.

The principal objects of the invention are to provide a substitute for cows' milk which may be prepared principally or wholly from vegetable materials; to provide an article of the class described which may be derived principally from relatively cheap grains or analogous material; to provide an article of the class described which may be produced, stored, shipped, and used either in solid or liquid form; to provide an article of the class described which shall have keeping qualities equal or superior to animal milk, and, in addition, capable of being stored for long periods in dry form without loss of food value or sacrifice of the properties of constituents usually associated with fresh cow's milk; to provide a product of the class described which may be prepared simply and inexpensively from relatively cheap materials, such as soy beans; and, in general, to provide an improved product or article of the character referred to.

In preparing our product, we prefer to utilize as a base one of the leguminous grains, such as the soy bean.

First, a sufficient quantity of soy beans, of good average grade, is washed thoroughly in cold water, which carries away any dirt or other foreign matter adhering to the outer skins of the beans. Subsequently, the clean washed beans are soaked in cold water for several hours, until the skins become sufficiently softened. The beans are then suitably separated, for instance, with a suitable sieve, from the water used for soaking, which may be discarded. The beans from which the water has been drained off are now in condition to be utilized for the preparation of the milk.

During the further treatment of the beans, the skins may be removed from the beans or not, although we prefer to take the entire bean unstripped from the skin so as to obtain in the final product the maximum percentage of the so-called vitamins which, as is now generally understood, and known, are principally contained either in the skin coating of the grain or in the layer immediately under the husk.

The wet beans, either stripped or unstripped, are now finely mashed and extracted with five to ten times their weight of cold water, which may be used as such without the addition of chemicals. However, in actual practice, we may use a half-saturated solution of calcium hydroxid instead of plain water. The extraction is carried on until practically all the protein and fat of the soy beans has been extracted. The milk-like suspension is then separated from the grain by passing through heavy muslin, and finally the grains are caused to give up the remaining adherent suspension by pressure between filter cloths of heavy muslin in a suitable press.

The watery extract or suspension which constitutes the base for the vegetable milk of our invention has an appearance similar to that of cows' milk and contains vegetable fat and vegetable protein in a finer suspension than occurring in ordinary cows' milk. The percentage of cane sugar in the extract is extremely small and, if desired, an additional quantity of sugar, for instance, either milk sugar, glucose, maltose, or cane sugar, as required, may be added in the proportions necessary to secure a vegetable milk containing the several constituents needed for body nutrition. Also, if found desirable upon analysis of the milk, certain quantities of the important deficient salts, such as those of sodium, potassium, calcium, and magnesium, either chlorates or phosphates, or both, may be added to correct any actual or fancied deficiency in such elements.

In order to facilitate the storage of the soy bean milk and render it convenient for shipping purposes, we prefer to evaporate the product to dryness in a suitable vacuum apparatus.

Sterilization of our improved soy bean milk may be effected without sacrifice of any of its desirable properties and without separation of any of its ingredients. It may also be stated that our improved vegetable milk prepared as above and to which the necessary amounts of sugar and these salts have been added, is superior in certain respects to cows' milk as a food, because of its higher protein content and because the necessary food elements, including the vitamins, are present in balanced proportions. It may be used to advantage instead of cows' milk.

Our invention is not limited to the particular details set forth in the above description, which are merely illustrative of one way of preparing our improved vegetable milk. The scope of the invention should be determined by reference to the appended claims.

We claim—

1. The process of preparing vegetable milk from a grain, which consists in soaking the grain in water, draining off the water, mashing the grain, extracting the mash with water, and subsequently separating the extract from the inextractable residue.

2. The process of preparing vegetable milk from soy beans, which consists in soaking the beans in water until softened, mashing the softened beans, extracting the mash with water, removing the extract from the inextractable solids, adding deficient elements, such as sugar and tissue salts, to the milk-like extract, and subsequently evaporating the product to dryness.

ALFRED S. BURDICK.
CARL NIELSEN.